United States Patent [19]

Stedman, Jr. et al.

[11] 3,980,229
[45] Sept. 14, 1976

[54] TEMPERATURE CONTROLLED REGULATOR

[75] Inventors: Hubert Q. Stedman, Jr., Santa Ana; Gerald G. Steele, Mission Viejo; Robert P. Smith, Newport Beach, all of Calif.

[73] Assignee: Parker-Hannifin Corporation, Cleveland, Ohio

[22] Filed: Apr. 1, 1975

[21] Appl. No.: 564,064

[52] U.S. Cl. .......................... 236/12 A; 236/80 B; 251/35; 251/44
[51] Int. Cl.² ........................................ G05D 11/16
[58] Field of Search ..................... 236/12 A, 80, 13; 251/35, 44

[56] References Cited
UNITED STATES PATENTS

| | | | |
|---|---|---|---|
| 2,161,258 | 6/1939 | Kronmiller | 236/80 |
| 2,550,907 | 5/1951 | Brown | 236/12 A |
| 2,977,966 | 4/1961 | Matthews | 236/80 UX |
| 3,160,346 | 12/1964 | Kimm | 236/12 |

*Primary Examiner*—William E. Wayner
*Attorney, Agent, or Firm*—Donnelly, Maky, Renner & Otto

[57] ABSTRACT

A temperature controlled regulator in which valved air inlets communicated with air pressure sources at different temperatures control the flow of air into a mixing chamber to maintain the outlet temperature of the mixture within specified limits, said regulator being characterized in that the valve actuator has first and second chambers on opposite sides thereof respectively exposed to the pressure of the mixture and to a reduced air pressure between the downstream side of a variable area orifice controlled by a temperature sensor in the regulator outlet and the upstream side of a variable area pressure control or bleed orifice, the first-mentioned variable area orifice being decreased or increased in size by decrease or increase of the mixture temperature with reference to said specified value thus to vary the pressure in said second chamber in relation to the pressure acting in said first chamber to inversely vary the air flow through said inlets thus to maintain a specified temperature of the mixture. The regulator herein is further characterized in that the temperature sensor comprises elongated members which have different coefficients of linear thermal expansion arranged so that, upon increase in temperature of the air mixture, a valve member engaged with the member having the lower coefficient is moved away from a seat member to increase the size of the variable area orifice and so that, upon decrease of the temperature of the mixture, said valve member is moved toward the seat to decrease the size of the variable area orifice, said seat member being yieldable upon engagement by the valve member to prevent damage to the valve member or to the seat member upon yet further decrease of the mixture temperature or during periods of non-use of the regulator.

9 Claims, 2 Drawing Figures

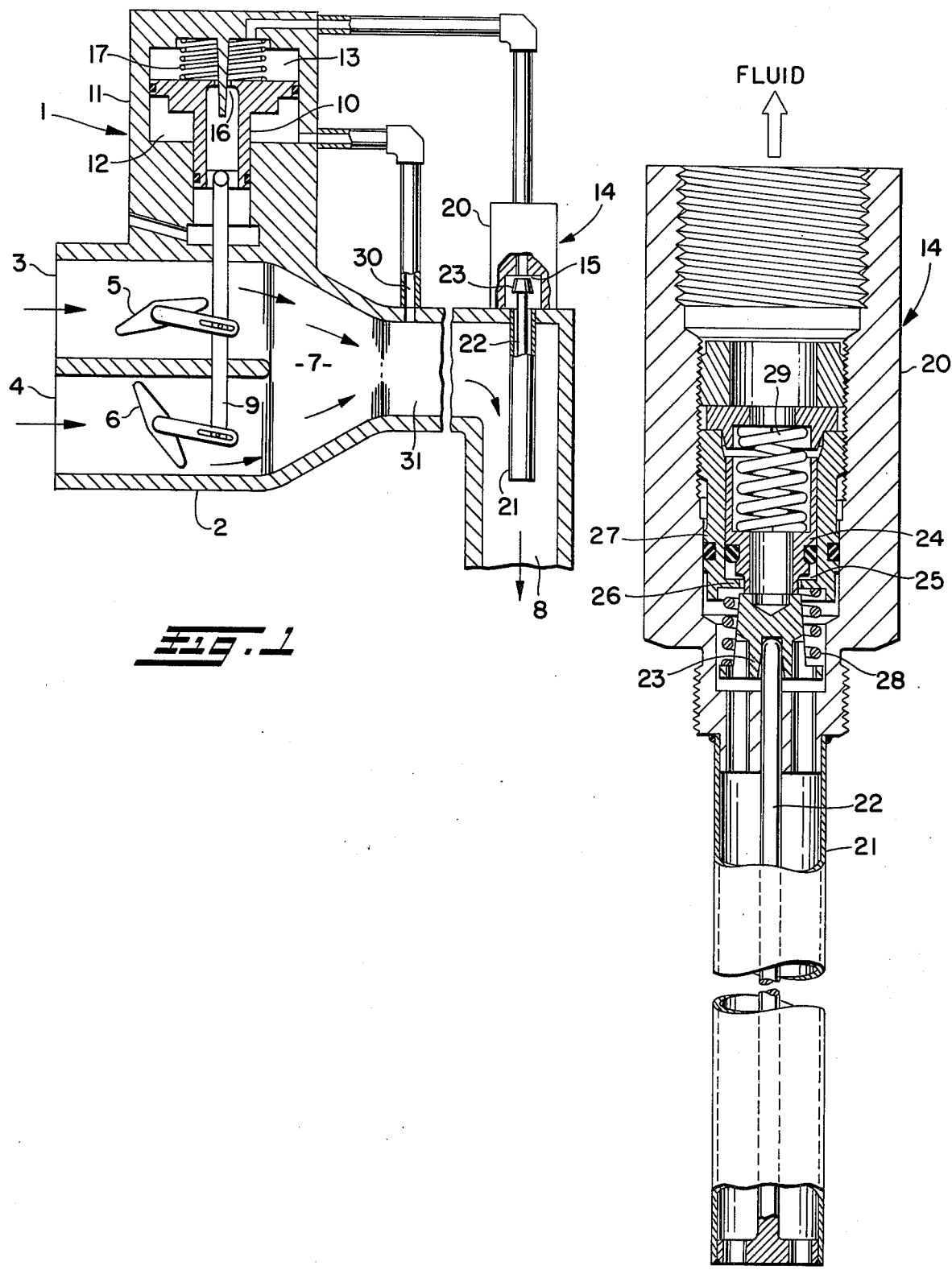

TEMPERATURE CONTROLLED REGULATOR

BACKGROUND OF THE INVENTION

In one known form of temperature controlled regulator as disclosed for example in the U.S. Pat. No. 3,561,482, the valve housing is provided with hot and cold fluid inlet ports having a mixing chamber, and having a temperature sensing device in the outlet operative to conduct to a valve actuating motor a pressure which is between the pressure in the cold fluid inlet and the downstream pressure in the valve outlet. Such variable pressure acting on one side of the motor in opposition to the fluid pressure in said cold fluid inlet is operative to increase the flow of hot fluid and to decrease the flow of cold fluid when the temperature sensed by the thermostat decreases and to decrease the flow of the hot fluid and to increase the flow of cold fluid when the temperature sensed by the thermostat increases thereby to maintain a predetermined temperature at the valve outlet in which the hot and cold fluids are mixed.

SUMMARY OF THE INVENTION

In contradistinction to known regulators, the temperature sensing means in the regulator outlet herein operates a variable area orifice to decrease the area of the orifice when the mixture temperature decreases below a predetermined temperature and to increase the area of the orifice when the mixture temperature increases above such predetermined temperature, the downstream pressure with respect to said variable area orifice being conducted to a pressure chamber of the valve actuator and the pressure in said chamber being controlled by a bleed orifice communicating the pressure chamber with ambient pressure, the actuator for the valves in the hot and cold inlets being moved in one direction by predominance of the force resulting from pressure of the mixture acting in a pressure chamber of smaller area with reference to the force due to the reduced pressure acting in said larger pressure chamber, and being moved in the opposite direction by predominance of the force resulting from a higher reduced pressure acting on the larger chamber with reference to the force due to the mixture pressure acting on the smaller chamber.

It is a further principal object of this invention to provide a temperature controlled regulator of the character indicated having a novel form of temperature sensor in which a valve operated by the temperature sensing means engages a yieldable seat to prevent damage either to the seat or to the valve member under low temperature conditions below desired operating temperature or low temperatures such as ambient temperatures encountered when the regulator is not in use.

Other objects and advantages will appear from the ensuing description.

BRIEF DESCRIPTION OF THE DRAWING

FIG. 1 is a cross-section view of a preferred embodiment of the present temperature controlled regulator; and FIG. 2 is a detailed cross-section view of a preferred form of temperature sensing means which provides a variable area orifice to control the valve actuator.

DETAILED DESCRIPTION OF A PREFERRED EMBODIMENT

Referring to FIG. 1 the temperature controlled regulator 1 herein comprises a housing 2 having a cold air inlet 3 which by way of example may be supplied with 75 psi air at a temperature of 190°F. and a hot air inlet 4 which is supplied with air also at 75 psi and a temperature of say 400°–900°F. In each inlet 3 and 4 is a valve member 5 and 6 to regulate the flow of cold and hot air to a mixing chamber 7, the housing 2 terminating in an outlet 8 from which it is desired that the outlet temperature of the air mixture be maintained at a prescribed level, for example, 400°–450°F.

The valves 5 and 6 are operated in inverse relation as by means of a rod 9 connected thereto, with the rod 9 being actuated by a valve actuator which herein is in the form of a piston 10 reciprocable in a cylinder 11 and having a first annular area 12 exposed to pressure in the mixing chamber 7 and having a larger area 13 on the other side exposed to pressure downstream of the mixing chamber 7 pressure. The housing 2 has therein a temperature sensing device 14 which defines a variable area orifice 15 leading to the chamber 13 and a pressure control bleed orifice 16 communicates the chamber 13 with ambient pressure.

In FIG. 1 the regulator 1 is shown in an equilibrium condition whereat the fluid mixture is of desired predetermined temperature with a predetermined pressure drop across the variable area orifice 15 and a predetermined pressure drop across the pressure control orifice 16 to maintain the cold and hot valves 5 and 6 as shown. Should the temperature in the outlet 8 decrease to less than the desired predetermined temperature, the variable area orifice 15 will decrease in area with resulting increased pressure drop thereacross and consequent reduced pressure in the chamber 13 whereby the pressure acting in the area or chamber 12 will tend to move the valve actuator 10 upwardly to increase the flow through the hot inlet 4 and to decrease the flow through the cold inlet 3 thereby to tend to bring the outlet temperature back to desired predetermined temperature. On the other hand, should the outlet temperature increase above the predetermined temperature, the size of the variable area orifice 15 will increase with accompanying decreased pressure drop and hence an increased pressure in the chamber 13 which will cause a downward movement of the actuator 10 and accompanying decreased flow through the hot inlet 4 and increased flow through the cold inlet 3 thus to tend to restore the outlet temperature to predetermined value.

Pressure control orifice 16 is also a variable area orifice and its flow capacity increases and decreases in direct proportion to increase or decrease of the flow capacity of orifice 15. Moreover, if the temperature in the outlet 8 decreases sufficiently for closing of the variable area orifice, the chamber 13 will be subjected to ambient pressure whereby pressure in the chamber 12 will urge the actuator 10 upwardly to its maximum position to close the cold inlet valve 5 and to fully open the hot inlet valve 6. In the other extreme, when the outlet temperature greatly exceeds the desired predetermined temperature, the variable area orifice 15 will increase in size sufficiently to urge the actuator 10 to its lowermost position together with the assistance of spring 17 to close the hot inlet valve 6 and to fully open the cold inlet valve 5.

Referring now in detail to the temperature sensing means 14 as shown in FIG. 2, the same comprises a body 20 which has a screw-threaded connection with the regulator housing 2 and which has secured thereto as by welding or brazing an elongated tube 21 which is of material having a relatively high coefficient of thermal expansion. Secured to the lower end of said tube 21 is a rod 22 which is of material having a low coefficient of thermal expansion with reference to that of the tube 21 and the upper end of said rod is engaged by a spring-loaded valve member 23 which defines with the spring-loaded seat member 24 the aforesaid variable area orifice 15 which progressively increases in size as the temperature increases. At ambient temperatures, there is a clearance 25 between the seat member 24 and a shoulder 26 in the bushing 27 which is screw-connected in the body 20 and at about normal operating temperature, the tube 21 will expand with reference to the rod 22 such that the spring 28 will urge the valve member 23 downwardly with accompanying downward movement of the seat member 24 through the spring 29 and thus under conditions of ambient temperatures or non-use of the regulator 1, the contact pressure between the valve member 23 and the seat member 24 is limited to that exerted by the spring 29. However, once said clearance 25 has been taken up, any increase in temperature to which the tube 21 and rod 22 is exposed will result in expansion of the tube 21 in relation to the rod 22 whereby the valve member 23 will move downwardly with respect to the seat member 23 to define a variable area orifice 15 of area which increases as the temperature increases.

When the temperature in the outlet 8 is at desired predetermined temperature, the variable area orifice 15 will be of prescribed size in relation to the area of the pressure control orifice 16 to provide flows of cold and hot fluid in the inlets 3 and 4 to maintain such predetermined temperature. As already explained, if the temperature in the outlet 8 decreases to a value less than such predetermined temperature, the size of the variable area orifice 15 will decrease with increased pressure drop thereacross whereby the force of the higher pressure acting on the annular area 12 of the actuator 10 will urge the actuator 10 upwardly to slightly close the cold inlet valve 5 and to slightly open the hot inlet valve 6 thus to tend to increase the outlet temperature to predetermined value. On the other hand, when the outlet temperature increases above the predetermined temperature, the variable area orifice 15 will increase in size with resulting decreased pressure drop with consequent downward movement of the actuator 10 and resulting partial closing movement of the hot inlet valve 6 and partial opening of the cold inlet valve 5 thus to decrease the outlet temperature to such predetermined value.

As evident, the pressure control orifice 16 which communicates the chamber 13 with the ambient pressure is also a variable area orifice which is of minimum size at the uppermost position of the actuator 10 and of maximum size at the lowermost position of the actuator 10. Of course, should the variable area orifice 15 be closed by decreased temperature in the outlet 8, the pressure in the chamber 13 will be decreased to ambient pressure via the pressure control orifice 16 whereupon, the higher pressure acting on the annular area of chamber 12 will urge the actuator 10 upwardly to further open the hot inlet valve 6 and to close the cold inlet valve 5.

By way of illustrative example, when the inlets 3 and 4 are at 75 psi and temperatures of 190° and 900°F., respectively, the combined flow of 3.0 pounds per second will produce a pressure drop of 5.0 psi maximum and it is preferred that the distance between the passage 30 and the sensor 14 be 10 or more times the diameter of the passage 31.

The temperature control regulator 1 herein is intended to deliver hot air at the prescribed temperature to operate an aircraft engine starter motor but as apparent the regulator 1 herein may have a multitude of other uses wherein it is desired to mix fluids at different temperatures to provide a predetermined mixture temperature at the regulator outlet 8.

The embodiments of the invention in which an exclusive property or privilege is claimed are defined as follows:

1. A temperature controlled regulator comprising a housing having an outlet for discharge of a mixture of fluids at a predetermined temperature; valve means for proportioning the flow of different temperature fluids into said housing to maintain such predetermined temperature of the fluid mixture; valve actuating means in said housing operatively connected with said valve means and defining with said housing a first chamber which is exposed to the pressure of the fluid mixture in said housing downstream of said valve means, and a second chamber of larger area than said first chamber which is exposed to the pressure of the fluid mixture further downstream of said valve means via a variable area orifice, said second chamber having a pressure control orifice communicating said second chamber with ambient pressure externally of said housing; and temperature sensing means in said housing exposed to the fluid mixture in said outlet and operative upon decrease or increase of the temperature of said mixture below or above said predetermined temperature to decrease or increase the size of said variable area orifice thus to vary the pressure drop thereacross whereby variation of the fluid pressure forces in said first and second chambers is effective through said valve actuating means to actuate said valve means for maintaining the fluid mixture at said predetermined temperature.

2. A temperature controlled regulator comprising a housing having an outlet for discharge of a mixture of fluids at a predetermined temperature; valve means for proportioning the flow of different temperature fluids into said housing to maintain such predetermined temperature of the fluid mixture; valve actuating means in said housing operatively connected with said valve means and defining with said housing a first chamber which is exposed to the pressure of the fluid mixture in said housing, and a second chamber of larger area than said first chamber which is exposed to the pressure of the fluid mixture via a variable area orifice, said second chamber having a pressure control orifice communicating said second chamber with ambient pressure externally of said housing; and temperature sensing means in said housing exposed to the fluid mixture in said outlet and operative upon decrease or increase of the temperature of said mixture below or above said predetermined temperature to decrease or increase the size of said variable area orifice thus to vary the pressure drop thereacross whereby variation of the fluid pressure forces in said first and second chambers is effective through said valve actuating means to actuate said valve means for maintaining the fluid mixture at said predetermined temperature; said variable area orifice comprising a valve member which is moved toward and away from a seat member in said housing to decrease or increase the size of said variable area orifice by said temperature sensing means responsive to decrease or increase of the temperature of said fluid mixture below or above said predetermined temperature; said valve member being engageable with said seat member, and said seat member being yieldable to limit the contact pressure between said seat and valve members in the event of continued decrease of the temperature of the fluid mixture after said valve member engages said seat member.

3. A temperature controlled regulator comprising a housing having an outlet for discharge of a mixture of fluids at a predetermined temperature; valve means for proportioning the flow of different temperature fluids into said housing to maintain such predetermined temperature of the fluid mixture; valve actuating means in said housing operatively connected with said valve means and defining with said housing a first chamber which is exposed to the pressure of the fluid mixture in said housing, and a second chamber of larger area than said first chamber which is exposed to the pressure of the fluid mixture via a variable area orifice, said second chamber having a pressure control orifice communicating said second chamber with ambient pressure externally of said housing; and temperature sensing means in said housing exposed to the fluid mixture in said outlet and operative upon decrease or increase of the temperature of said mixture below or above said predetermined temperature to decrease or increase the size of said variable area orifice thus to vary the pressure drop thereacross whereby variation of the fluid pressure forces in said first and second chambers is effective through said valve actuating means to actuate said valve means for maintaining the fluid mixture at said predetermined temperature; said pressure control orifice also being a variable area orifice which decreases or increases in size according to movement of said valve actuating means in a direction to actuate said valve means to increase or decrease the temperature of said fluid mixture.

4. The temperature controlled regulator of claim 3 wherein the flow capacity of said pressure control orifice varies in direct proportion to the flow capacity of said variable area orifice.

5. A temperature controlled regulator comprising a housing having an outlet to which air pressure sources at different temperatures are conducted via valve means operative to vary the flow from said sources to said outlet; valve actuating means in said housing including a pressure actuated component operatively connected to said valve means and defining with said housing a first chamber exposed to the air mixture in said outlet downstream of said valve means, and a second chamber of larger area than said first chamber exposed to reduced pressure of said mixture further downstream of said valve means via a variable area orifice and having a pressure control orifice bleeding said second chamber to the atmosphere; and a temperature sensing means in said housing responsive to decrease in temperature of said mixture below a predetermined temperature to decrease the size of said variable area orifice and hence to decrease the pressure in said second chamber such that said actuator is moved in one direction by pressure in said first chamber to actuate said valve means to increase and decrease the air flow from the respective higher and lower temperature sources, and responsive to increase of temperature of said mixture above said predetermined temperature to increase the size of said variable area orifice and hence to increase the pressure in said second chamber such that said actuator is moved in the opposite direction overcoming the force of the pressure in said first chamber to actuate said valve means to decrease and increase the air flow from the respective higher and lower temperature sources.

6. A temperature controlled regulator comprising a housing having an outlet to which air pressure sources at different temperatures are conducted via valve means operative to vary the flow from said sources to said outlet; valve actuating means in said housing including a pressure actuated component operatively connected to said valve means and defining with said housing a first chamber exposed to the air mixture in said outlet, and a second chamber of larger area than said first chamber exposed to reduced pressure of said mixture via a variable area orifice and having a pressure control orifice bleeding said second chamber to the atmosphere; and a temperature sensing means in said housing responsive to decrease in temperature of said mixture below a predetermined temperature to decrease the size of said variable area orifice and hence to decrease the pressure in said second chamber such that said actuator is moved in one direction by pressure in said first chamber to actuate said valve means to increase and decrease the air flow from the respective higher and lower temperature sources, and responsive to increase of temperature of said mixture above said predetermined temperature to increase the size of said variable area orifice and hence to increase the pressure in said second chamber such that said actuator is moved in the opposite direction overcoming the force of the pressure in said first chamber to actuate said valve means to decrease and increase the air flow from the respective higher and lower temperature sources; said pressure control orifice being a variable area orifice which is of progressively decreasing size as said actuator is moved by pressure in said first chamber overcoming the force of the reduced pressure acting in said second chamber.

7. A temperature controlled regulator comprising a housing having an outlet to which air pressure sources at different temperatures are conducted via valve means operative to vary the flow from said sources to said outlet; valve actuating means in said housing including a pressure actuated component operatively connected to said valve means and defining with said housing a first chamber exposed to the air mixture in said outlet, and a second chamber of larger area than said first chamber exposed to reduced pressure of said mixture via a variable area orifice and having a pressure control orifice bleeding said second chamber to the atmosphere; and a temperature sensing means in said housing responsive to decrease in temperature of said mixture below a predetermined temperature to decrease the size of said variable area orifice and hence to decrease the pressure in said second chamber such that said actuator is moved in one direction by pressure in said first chamber to actuate said valve means to increase and decrease the air flow from the respective higher and lower temperature sources, and responsive to increase of temperature of said mixture above said predetermined temperature to increase the size of said variable area orifice and hence to increase the pressure in said second chamber such that said actuator is moved in the opposite direction overcoming the force of the pressure in said first chamber to actuate said valve means to decrease and increase the air flow from the respective higher and lower temperature sources; said temperature sensing means comprising a body secured to said housing, a tube having one end secured to said body and extending longitudinally into said outlet, a rod secured to and extending from said other end of said tube toward said one end and being engaged by a valve member, a seat member in said body with respect to which said valve member moves to define such variable area orifice as said tube and rod are subjected to increasing temperature in said outlet, said tube having a larger coefficient of thermal expansion than said rod.

8. The regulator of claim 7 wherein said seat member is yieldable and is engaged by said valve member upon predetermined decrease in temperature to which said tube and rod are subjected whereby further contraction of said tube with respect to said rod precludes imposition of high contact forces between said valve member and seat member.

9. A temperature controlled regulator comprising a housing having an outlet to which air pressure sources at different temperatures are conducted via valve means operative to vary the flow from said sources to said outlet; valve actuating means in said housing including a pressure actuated component operatively connected to said valve means and defining with said housing a first chamber exposed to the air mixture in said outlet, and a second chamber of larger area than said first chamber exposed to reduced pressure of said mixture via a variable area orifice and having a pressure control orifice bleeding said second chamber to the atmosphere; and a temperature sensing means in said housing responsive to decrease in temperature of said mixture below a predetermined temperature to decrease the size of said variable area orifice and hence to decrease the pressure in said second chamber such that said actuator is moved in one direction by pressure in said first chamber to actuate said valve means to increase and decrease the air flow from the respective higher and lower temperature sources, and responsive to increase of temperature of said mixture above said predetermined temperature to increase the size of said variable area orifice and hence to increase the pressure in said second chamber such that said actuator is moved in the opposite direction overcoming the force of the pressure in said first chamber to actuate said valve means to decrease and increase the air flow from the respective higher and lower temperature sources; said temperature sensing means comprising two elongated members having different coefficients of thermal expansion with the member of smaller coefficient being engaged with a valve member which moves away from a seat member in said housing as the elongated member with the larger coefficient expands due to increasing temperature of the fluid mixture in said outlet; said valve and seat members defining said variable area orifice.

* * * * *